Figure 1:
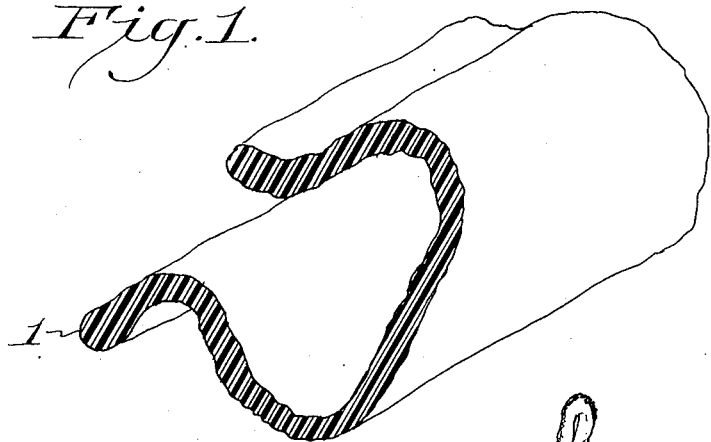

July 9, 1957  E. E. MAGAT ET AL  2,798,283
CONDENSATION POLYMER FILAMENT
Filed Dec. 9, 1953

INVENTOR
EUGENE EDWARD MAGAT and
DONALD RITTLER STRACHAN
BY
ATTORNEY

United States Patent Office 2,798,283
Patented July 9, 1957

2,798,283

CONDENSATION POLYMER FILAMENT

Eugene Edward Magat, Wilmington, Del., and Donald Rittler Strachan, Martinsville, Va., assignors to E. I. du Pont de Nemours & Company, Wilmington, Del., a corporation of Delaware Application December 9, 1953, Serial No. 397,149

11 Claims. (Cl. 28—82)

This invention relates to polymeric films and filaments and is more particularly concerned with novel filamentary structures prepared directly by an interfacial polymerization of fast reacting substances which will be referred to as interfacial spinning.

The direct preparation of films and filaments from two or more reactants is accomplished by conducting an interphase polymerization between fast reacting organic condensation polymer-forming reactants at an interface of controlled shape between two phases, each of which contains a reactant to form a shaped condensation polymer and withdrawing the polymer from the interface. This process, for example, comprises bringing a liquid phase comprising one of the condensation polymer-forming reactants (e. g., a liquid organic diamine or solution of an organic diamine) and another liquid phase comprising the coacting polymer-forming reactant (e. g., a solution of an organic dicarboxylic acid halide) together to form a liquid-liquid interface, controlling the shape of the interface until a shaped polymer has formed at the interface, and then withdrawing the polymer from the interface. The polymer may be withdrawn continuously from the interface as a continuous self-supporting film or filament.

Broadly, the reaction involves one or more active hydrogen-donor substances and one or more active hydrogen-accepting substances whereby the active hydrogen-accepting substance either retains the active hydrogen as part of the polymer molecule or splits it out in combination with an atom or radical from itself via condensation to make the polymer molecule. Both the active hydrogen-donor substances and the active hydrogen-accepting substances may be either di- or polyfunctional with respect to these capabilities.

Illustrative of the active hydrogen-accepting substances which react with di- or polyamines in the direct formation of polymeric films and filaments are di- and polycarboxylic acid halides, phosphoric anhydrides of di- and polycarboxylic acids, di- and polyisocyanates, di- and polyisothiocyanates, phosgene, di- and polyazlactones, mixed anhydrides of di- and polycarboxylic acids with trifluoroacetic acid, di- and polychloroformates, di- and polysulfonic acid halides, disulfonyl dilactams and polysulfonyl polylactams. Other active hydrogen-donor substances which are operative include thiourea, dithiobiuret, guanidine, aminothiazine, aminothiols, aminoalkylphenols, di- and polyhydric phenols, di- and polythiols and the like.

In general, the preferred class of polymeric films and filaments are prepared when one of the substances is a low molecular weight organic compound having two or more similar or dissimilar reactive groups selected from the group consisting of amino and amidino-NHR, wherein R is H or alkyl; phenolic-OH; and —SH; and at least one of the substances is a low molecular weight organic compound having two or more reactive groups, each of which is capable of reacting with ethyl alcohol at room temperature to thereby yield a compound having two or more ester groups. The process and the conditions of this reaction are more completely described in copending application Serial No. 226,066, by E. E. Magat and D. R. Strachan, filed on May 12, 1951, now Patent No. 2,708,617, and application Serial No. 278,373, by R. C. Houtz, filed March 25, 1952, both assigned to the assignee of the present application.

It is an object of the preesnt invention to provide filaments of a highly unusual and novel physical structure which imparts desirable properties not found in previously known synthetic filaments. Other objects of the invention will become apparent from the following disclosure and claims.

Figure 2:
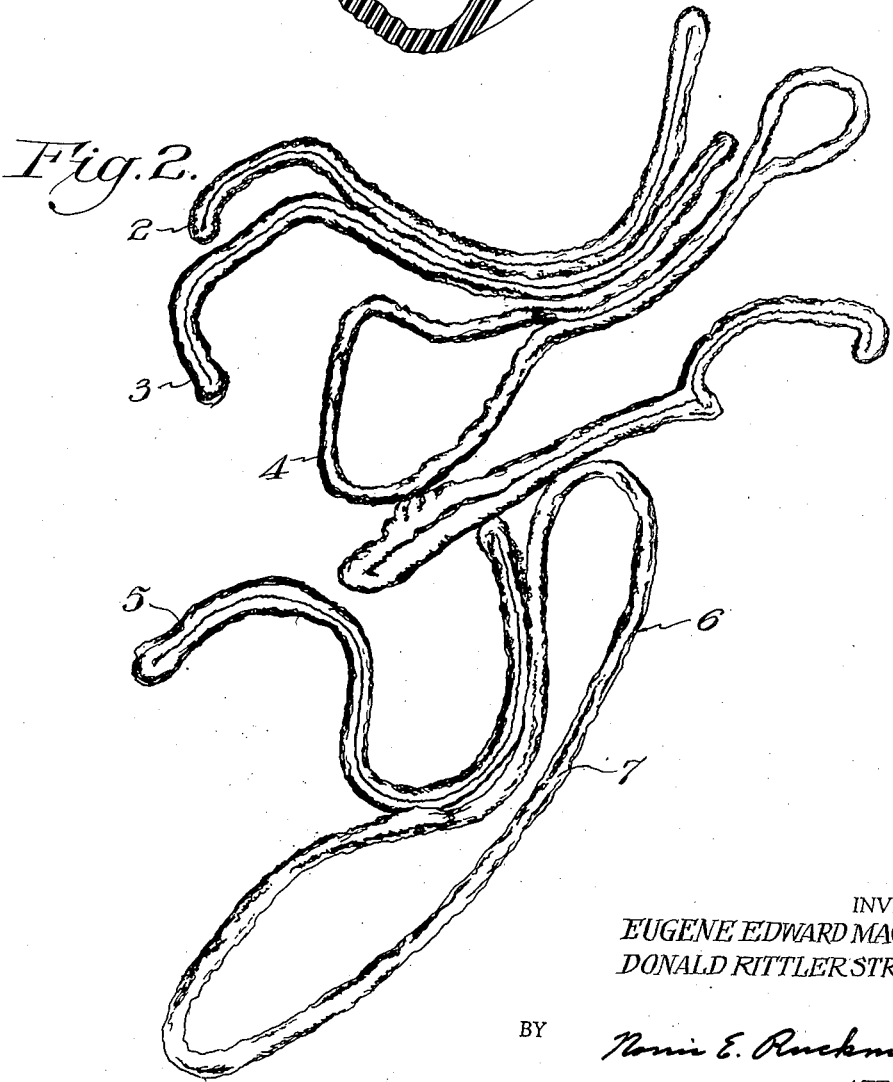

It has been found that filaments having highly desirable structures, particularly as regards cross-sectional configuration, can be produced by interfacial spinning processes involving interphase condensation polymerizations of the type mentioned above. While these new structures will be referred to as filaments, they are quite unlike any previously known filaments. This will be better understood by reference to the drawings of typical filaments, in which:

Figure 1 is a cross-sectional perspective view, at approximately 1000 times normal size, of one form of filament in accordance with this invention, and Figure 2 is a drawing, prepared from a photo-micrograph at 1000 times magnification, showing cross-sectional end views of filaments in accordance with this invention.

The novel structure of the filaments of this invention was studied by imbedding the filaments in wax, slicing off thin layers with a microtome, and viewing the slices under a microscope. Figure 2 shows the appearance, at 1000 times magnification, of a cross-sectional slice taken at right-angles to the length of typical filaments. The filaments are actually produced in continuous lengths and a complete filament would extend away from the plane of the paper continuously in both directions. This may be made clear by Figure 1, which shows how a very short length cut from a continuous filament would appear if it could be observed at an angle at a magnification of 1000 times.

These novel filaments were produced by a process which involved extruding a solution of one condensation polymer-forming reactant through a spinneret, or the equivalent, into a bath comprising the complementary reactant. The process is illustrated in detail in the examples. Polymer is formed at the interface between the solution extruded and the reactant bath to form a filament having a tube-like skin surrounding the solvent for the extruded reactant. The diameter of this tube as spun will approximate that of the spinneret orifice, and, in the initial uncollapsed condition before drawing or other treatment, will range from 0.0005 to 0.020 inch in diameter. Depending upon the processing steps following the formation of this hollow filamentary structure, the tube collapses with or without coalescence of the inner surfaces to form filaments having the highly unusual elongated cross-section observed in the drawings. These cross-sections may be controlled to have a length to width ratio of from 10:1 to 50:1, and can be made 100:1 or greater.

When viewed under a low magnification the filaments appear to be simple flat ribbons. However, at the high magnification shown in the drawings, the cross-sections are seen to have highly complex shapes which are random from filament to filament. When the tube is substantially fully collapsed the cross-section assumes various serpentine shapes having nodular ends as shown at 2, 3 and 5. The thickness of these ribbon-like structures is about twice the tube wall thickness and is usually from one to forty hundred-thousandths of an inch thick. A partially collapsed tube is shown at 4. Another filament form is shown at 6, where the tube is not flattened sufficiently for the opposite walls or skins to contact. This most clearly shows the skin thickness 7, which is usually not over twenty hundred-thousands of an inch. All of the surfaces of the filaments are quite rough. This is indicated but, since the roughness is microscopic or even submicroscopic in size, this is not particularly noticeable even at 1000 magnifications. These are all distinguishing characteristics which are quite different from the filaments of the prior art and impart highly desirable properties to the filaments in use.

The filaments of this invention have a surprisingly low luster. In view of their generally ribbon-like shape it might be expected that they would be more highly lustrous than the generally round filaments of the prior art. The reverse is actually the case, apparently due to the highly irregular surface which is seen only with high magnification.

Textile material made from these filaments has, in comparison with previously known synthetic filaments, a desirable "dry hand," unusual warmth, high resistance to pilling and outstanding absorbency. These properties appear to be related to be unusual cross-section, specifically, its high length to width ratio, its highly irregular or serpentine shape, and the random irregularity as between different filaments. This randomness of irregularity from filament to filament appears to be especially significant. It will be seen from Figure 2 that the configuration is such that the filaments cannot pack closely. Yarn composed of such filaments will be full of bulk-giving voids, which will also be true of fabric made from the yarn.

The highly absorbent character of these filaments is also due to the hollows within the individual filaments. When the filaments are prepared in such a way that the internal walls are not stuck together, the tubes can take up water or the like until the walls are swollen back to their original almost circular shape. Each such filament is a tiny capillary tube capable of holding much more than its weight of water. The filaments can be prepared so as to be preponderantly of this type by spinning into a hot aqueous spinning bath containing 10 to 30% of sodium sulfate in addition to the polymer-forming reactant, as illustrated in Example XI. Sodium hydroxide can be used, instead of sodium sulfate, in amounts compatible with the bath composition and not less than 5%, as discussed just prior to Example XI. Filaments prepared in this way have an enhanced resilient feel and ease of processing in textile operations. On the other hand, different conditions can be employed in order to produce ribbon-like filaments in which the interior surfaces are largely coalesced, as illustrated in Example XII.

Processes for preparing the filaments of this invention will now be illustrated, but the invention is not limited to filaments so prepared as they can be prepared by interfacial spinning processes generally. The following examples and supplementary disclosure are intended merely to be illustrative rather than limitative. The proportions are given in parts by weight unless otherwise specified.

*Example I*

A spinning solution was made up containing 87.7 parts of carbon tetrachloride, 2.3 parts of polyisobutylene (Vistanex B-100-XC) and 10.0 parts sebacyl chloride. The solution viscosity was 220 centipoises compared to 1.0 centipoise for the unthickened solution. The solution was spun through a tantalum spinneret having eight holes of 0.005" diameter into a bath containing 83 parts water, 10 parts hexamethylenediamine and 7 parts sodium hydroxide. The spinning solution jetted smoothly and evenly into the spinning bath and produced filaments of much improved denier uniformity over those obtained without the use of the thickener. The fibers were wound up on a hollow, perforated roll at 30 yards per minute in a container of methanol.

The spinning cell was a cylinder constructed from a nickel pipe containing a nickel piston with rings made from "Teflon" tetrafluoroethylene resin. The spinning solution was placed in the lower part of the cell, the piston inserted and the remaining portion of the cell filled with a hydraulic fluid such as glycerol or oil. The spinning solution was then forced out by metering the hydraulic fluid at the desired rate into the upper portion of this closed system. The spinneret assembly included a polyethylene gasket, five layers of fabric made from "Orlon" acrylic fiber, another polyethylene gasket and the tantalum spinneret which was of the conventional hat-shaped viscose type, ½" in diameter. The bath consisted of a stainless steel tray about 4 feet long in which the bath solution was circulated by withdrawing at the far end and pumping by means of a circulating pump through a gravity filter to the spinneret end of the bath. The filaments were withdrawn by means of a driven-roll idler-roll combination and wound up on a constant speed perforated tube through which a washing fluid could be circulated as desired.

*Example II*

In an experiment similar to that of Example I, except that the spinning solution contained a smaller concentration of polyisobutylene, namely, 0.7 part and that a cross-linking agent, tricarballylyl chloride, was added in the amount of 0.05 part. The filaments were withdrawn at a speed of 17 yards per minute and passed to a second roll running at 34 yards per minute to effect a drawing of 2 times its length on the run. The spinning solution in this instance had a viscosity of 50 centipoises. Again the jetting was excellent and the yarns extremely uniform in denier. In this experiment a filter pack was employed behind the spinneret. The pressure was approximately 400 lbs. per square inch.

*Example III*

In an experiment similar to that of Example I, a spinning solution composed of 60 parts "Aroclor" 1254 (a mixture of chlorinated biphenyl isomers made by Monsanto Chemical Company), 30 parts "Arclor" 1248 (a mixture of chlorinated biphenyl isomers made by Monsanto Chemical Company), and 10 parts sebacyl chloride was spun through an 8-hole tantalum spinneret into a solution composed of 83 parts of water, 10 parts hexamethylenediamine and 7 parts sodium hydroxide. The filaments thus formed were wound up at 70 yards per minute in acetone and found to be extremely uniform in denier. The spinning pressure was approximately 500 lbs. per square inch.

*Example IV*

The spinning solution was composed of 90 parts "Aroclor" 1248 and 10 parts of sebacyl chloride. The bath was as described in Example I. The spinning solution was spun through a tantalum spinneret containing 25 holes each 0.003 inch in diameter, run through a rinsing bath of acetone prior to being wound up at 20 yards per minute in a washing bath of alcohol. After thorough extraction the yarn was boiled off and a white, soft, flexible yarn having filaments of extremely uniform denier was obtained. The inherent viscosity was 1.2 in m-cresol. The filaments after processing as described were collapsed tubes having ribbon-shaped cross-sections approximately 5 microns thick and 60 microns wide. After drawing to 2.4 times its length at 150° C., the yarn showed a tenacity of 2.8 grams per denier at an elongation of 20%.

*Example V*

A spinning solution having a viscosity of 41 centipoises and composed of 90 parts chlorobenzene, 10 parts adipyl chloride and 10 parts of a vinyl acetatecrotonic acid copolymer (95/5) was spun into a bath containing 6 parts hexamethylenediamine, 4 parts 3-3′-iminobispropylamine and 90 parts water through a tantalum spinneret containing 20 holes of 0.003 inch diameter. The yarn was withdrawn from the bath at 57.7 yards per minute, wet stretched 1.34 times and wound up at 77.4 yards per minute. The yarn produced was extremely uniform in denier resulting from the smooth jetting of the viscous spinning solution into the bath. The spinning equipment employed included an upper bath tank (in which was immersed the spinneret) connected to a lower tank (approximately 3 inches lower) by a ½ inch diameter glass tube 30 inches in length to serve as a cocurrent spinning tube. An outlet from the lower tank ran to a circulating pump which could return the bath fluid to the upper bath tank through either a heat exchanger, if elevated temperatures were desired, or through a refrigeration system if subnormal temperatures were required. The bath fluid flowed by gravity through the cocurrent tube with the rate of flow being determined principally by the height of the fluid in the upper tank.

The spinning pump was especially designed to meter corrosive fluid at a constant rate over a wide range of pressures. The pump comprised four pistons operated by cams to give a triangular flow pattern for both intake and discharge strokes. By phasing the cams so that operations of the cylinders are 90° apart a continuous intake and discharge flow was obtained which was constant and non-pulsating. This meant that the pump was useful for either adding to or removing from a system fluid at a constant rate of flow. Intake and discharge valve assemblies were screwed into the cylinder block to permit easier replacement as required. Two sets of the valves were placed in series when operating at exceptionally high pressures. This was accomplished by making the intake and discharge manifolds as short drilled members which clamped over the valve assemblies with gaskets made of "Teflon" tetrafluoroethylene resin. These manifolds were made from solid bar stock to prevent surging in the lines.

This pump was used to withdraw the spinning solution from a reservoir and extrude it through a multi-hole spinneret. The yarn was withdrawn from the bath by making one turn about a perforated resin-coated hollow roll and thence collected on a similar roll rotating in a bath of washing fluid. The windup roll was capable of being operated at a faster surface speed than the withdrawing roll in order to effect a draw on the as-spun yarn, if desired.

*Example VI*

Using the equipment and the procedures described in Example V, a spinning solution containing 86 parts monochlorobenzene, 10 parts adipyl chloride and 4 parts polyisobutylene ("Vistanex-80"), having a viscosity of 44 centipoises, was extruded through a tantalum spinneret having 20 orifices 0.003 inch in diameter into the bath described in Example I. The wound-up filaments were extremely uniform in denier as a result of the uniform jetting of the spinning solution.

*Example VII*

A spinning solution composed of 16.8 parts of ethylene/vinyl acetate copolymer (75/25), 68.2 parts toluene and 15 parts adipyl chloride was employed in the process and apparatus of Example V to produce a 20-filament yarn with considerable denier uniformity.

*Example VIII*

Following the procedures of Example I, a spinning solution containing 5 parts hexamethylenediamine, 3 parts 3,3'-iminobispropylamine, 6 parts polyvinyl alcohol and 86 parts water was spun through a 20-hole spinneret into a spinning bath made up of 10 parts adipyl chloride in 90 parts chlorobenzene. The spinning solution jetted evenly and steadily through the tantalum spinneret having 0.003 inch orifices. An 850 denier yarn was wound up which was drawn to 2 times its length to give a strength of 1 gram per denier.

*Example IX*

Using the equipment and procedures described in Example V, a spinning solution containing 10 parts adipyl chloride, 0.27 part of an "Alfin" rubber and 89.73 parts monochlorobenzene was spun into the bath composition of Example I through a tantalum spinneret containing 20 holes of 0.007 inch diameter. This "Alfin" rubber was a polyisobutylene having an inherent viscosity of 16 in the solvent and made by the use of an "Alfin" catalyst. (See A. A. Morton et al., Industrial Engineering Chemistry, vol. 44, p. 2876 (1952)). In this experiment the yarn was withdrawn from the bath at 14.6 yards per minute and wound up at 19.6 yards per minute employing methanol as a washing medium at windup. An extremely uniform 214 denier yarn was produced, which in the undrawn state possessed a tenacity of 0.4 gram per denier at an elongation of 253%. After drawing to 4.3 times its length at 150° C., the yarn had a denier of 62 and gave a tenacity of 1.9 grams per denior at an elongation of 25%.

When the same experiment was carried out without the use of the "Alfin" rubber in the spinning solution, the yarn was not nearly as uniform in denier, nor nearly as strong, since the best tenacity that could be obtained in the drawn yarn was 0.7 gram per denier at an elongation of 27%.

*Example X*

Using the equipment and procedures described in Example V, a spinning solution containing 10 parts sebacyl chloride, 0.15 part "Alfin" rubber and 89.85 parts monochlorobenzene was spun into a bath containing 10 parts hexamethylenediamine, 10 parts sodium hydroxide and 80 parts water. The solution was jetted through a tantalum spinneret having 20 holes of 0.007 inch diameter at 18.9 yards per minute. The yarn was removed from the bath at 9.5 yards per minute and wound up at 12.2 yards per minute using a methanol wash at the windup. The spinning was extremely even and steady to produce a fully uniform yarn having an intrinsic viscosity in m-cresol of 1.3. After drawing to 4.2 times its length at 150° C., the yarn had a tenacity of 3.0 grams per denier at 30% elongation.

When spinning under similar conditions, except that the "Alfin" rubber was left out of the spinning solution, a yarn was obtained with an inherent viscosity of 1.38. However, because of non-uniformities, the yarn could be drawn only to 3.95 times its length and the best tenacity that could be obtained was 1.8 grams per denier at 33% elongation.

As indicated, the optimum process involved the spinning of a thickened solution, usually of the acid chloride. Solvents which were well suited for the acid chloride included carbon tetrachloride, chlorobenzene, hexane, and trichlorotrifluoroethane. The optimum concentration of the acid chloride in the spinning solution was usually in the range of 3 to 25%. At concentrations below this range, yarn production became increasingly difficult, particularly when the acid chloride was adipyl chloride. At concentrations above this range, the yield of the spun filaments based on the acid chloride, was adversely affected.

Thickening agents useful in this invention comprise polymeric materials of high molecular weight substances which can be dissolved or dispersed in one or the other of the reactant phases. Useful materials include vinyl polymers, synthetic and natural rubbers, high molecular weight hydrocarbons and halogenated derivatives thereof, synthetic and natural proteinaceous materials, polyethers, polyamides, polyesters, polysaccharides, cellulose derivatives and the like. The thickening agents themselves may serve as the solvent for reactant when their physical properties are suitably adapted. Such agents may comprise naturally viscous liquids such as high molecular weight substances, mixtures of low melting solids which are fluid under the conditions of reaction, anistropic media involving mixtures, or other physical or chemical combinations capable of producing viscosity. It is essential that the thickening agent be inert toward the reactants in the phase which contains it and also that it possess a relatively low order of reactivity, if not complete inertness, toward the reactants in the other phase. Not all of the thickening agents are equally suitable for dissolving or dispersing in both of the reactant phases. Hence, where any particular thickening agent is to be employed, its physical and chemical properties, together with those of the respective reactants and solvents, will determine which reactant phase may be thickened with it and, hence, which reactant phase will be extruded into the other.

The spinneret could be either a hat-shaped multihole spinneret or a streamlined modification thereof e. g., in the form of a wedge, a chisel, a knife, or the like, as preferred. This streamlined modification provided easy and continuous access of the bath liquor without undue turbulence to the spinning solution as it was extruded from the spinneret. The spinneret was carefully centered in close proximity to the entrance end of the cocurrent tube in order to provide a minimum of turbulence in the flowing bath and in the freshly spun filaments.

The spinning process was satisfactory without the use of a cocurrent spinning tube, although limited to lower filament speeds than with it. The use of a cocurrently flowing bath fluid supported the filaments in their freshly spun state and permitted them to be withdrawn from the spinneret at markedly higher rates of speed. The spinning tube can be horizontal or vertical, or at any intermediate inclination desired. Usually, however, the geometry of the layout for the various pieces of equipment involved in the spinning process favors the use of a tube in a position somewhat inclined from the horizontal. Shorter or longer tubes or larger or smaller diameter tubes may be used, depending upon the selection of such parameters as the ratio of the volume of the spinning bath to the volume of the spun filaments within the tube, the ratio of the velocities of the spinning bath and the filaments, and the length of time which the filaments remain within the confines of the tube.

It may sometimes be desirable to apply a coating to the spinneret face in order to facilitate the spinning operation by minimizing the tendency of the spinning solutions to wet the face of the spinneret. One such compound, Duponol "ME" (a higher fatty alcohol sulphate) has been found to give an improved effect, particularly when employing spinning solutions comprising acid chlorides. Similar effects are achieved with the use of some of the thickening agents mentioned above and also can sometimes be achieved by adding other substances such as detergents or surface-active agents directly to the spinning solution.

A yarn windup and forwarding system outside the bath is customarily employed. The first such yarn forwarding device can be a simple cylindrical roll or a more complicated device such as an advancing reel. The primary purpose of this forward means is to maintain the desired relationship between the yarn speed and jet velocity of the spinneret on the one hand and the yarn speed and the linear speed of the bath flow on the other hand. The yarn speed may be considerably different from the jet velocity ranging from considerably below it (e. g., up to 50% below the jet velocity) to considerably above (e. g., 50 to 400% above the jet velocity). Usually it is preferred to operate the yarn speeds somewhat below the jet velocity. Where maximum productivity is desired, it is customary to employ a linear speed of the bath in the cocurrent tube somewhat higher than the linear speed of the filaments. Where an advancing reel is employed as the first yarn forwarding means, auxiliary operations, such as washing, finishing, stretching, shrinking, sizing and the like can be performed concurrently.

The second yarn forwarding means can be a constant surface speed windup means, a simple yarn forwarding roll, an advancing reel, or the like, capable of imparting a higher linear speed to the yarn than the first means so as to produce a stretch of the yarn in the wet state, if desired. This stretch, when applied, will customarily amount to about 2.5 times in length, although it may vary over a range from stretches considerably lower to stretches considerably higher, depending upon the product being produced and the process conditions being employed. Where the yarn is not washed prior to windup, it is usually washed during windup, either by rotating a bobbin in a bath of the washing medium or by feeding the washing medium to the interior of the bobbin to force it out through the layers of the wound-up yarn. Other adaptations include the use of a bucket wind with the wash liquor being fed to the center of the cake and thence through the cake by centrifugal force. Fluids which have proved particularly useful as washing media are methanol, ethanol and acetone. Frequently, when the washing step is omitted, the filaments adhere together such that the bobbin cannot be unwound. An acceptable manner of proceeding is to take the bobbin, wet with the wash liquor (since it shrinks on drying), unwind it and forward the yarn through a drying chimney with an appreciable cocurrent flow of a gas, such as air. The turbulence tends to open up the yarn simultaneously as it dries to yield a dry yarn in which none of the filaments are stuck together. The inner surfaces of filaments produced in this way are usually adhered together, giving a ribbon-like unitary structure. An alternative procedure is to apply a hydrocarbon fraction, such as kerosene or light mineral oil, alone or in a finish composition to the yarn as it is being wound up on the spinning windup. Preferably the finish application will be made after at least some washing has been performed.

The multifilaments thus produced can be drawn preferably in the temperature range of 25–200° C. to give structures of increased orientation and strength in a manner which is customary for synthetic linear condensation polymeric yarns. The drawing operation can be performed with or without a snubbing pin as desired and with or without the use of heating means to effect the drawing at an elevated temperature. It is not uncommon to orient these yarn structures by drawing as much as 3 times in length, or even more, to obtain desirable properties.

Customarily, the spinning bath is an aqueous phase containing, for example, a diamine in the production of polyamide fibers. When the spinning bath is thus comprised, it may also include a proportion of a cross-linking agent such as a triamine. The spinning process in most cases is optimum with a bath temperature at essentially room temperature or in some instances a few degrees above room temperature. Usually the optimum concentration of the amine or of the amine and the cross-linking agent in the spinning bath will fall within the range of 1.5 to 20%. Higher yields based on the acid chloride and higher wet strength ratios are obtainable when the bath concentration is in the middle to the upper portions of this range. The use of a cross-linking agent such as 3,3'-iminobispropylamine or hydrogenated methacrylonitrile trimer in the spinning bath resulted in higher wet strength for the spun yarns and it was, therefore, an important feature toward maintaining high standard of yarn qualities throughout the various yarn processing steps required on the wet yarn.

A spinning bath composition comprising sodium sulphate was found to be particularly adapted to the smooth and efficient production of high quality yarns in good yields by the interfacial spinning technique, particularly when the spinning bath was maintained at elevated temperatures in the neighborhood of 80° C., in contrast to the usual optimum at room temperature. The use of sodium sulphate in the spinning bath had a marked effect on the yarn wet strength, nearly tripling this value and also a very marked effect on the yield, based on the acid chloride, of the yarn produced. Yields as high as 96% were obtained when employing a bath saturated with sodium sulphate (approximately 30% by weight) at 87° C. The other bath components were 6% hexamethylenediamine and 4% 3,3'-iminobispropylamine and water. At room temperature the sodium sulphate in the bath had little or no effect on the operating performance or yarn quality when compared to the bath without the sodium sulphate. A whole host of other compounds, such as potassium carbonate, potassium chloride, ammonium sulphate, calcium chloride, aluminum sulphate, sodium thiocyanate, glucose, sodium phosphate, copper sulphate, magnesium sulphate, zinc chloride, and sodium sulphite did not improve the spinning performance when used in the bath.

Another compound, sodium hydroxide, did have a favorable effect similar to that achieved with sodium sulphate. Here again, the wet strength was found to increase with increasing concentrations of the additive to the bath at a temperature of 70-95° C., up to the point where the diamine was salted out. Addition of excess sodium hydroxide above this value caused a marked decrease in the wet strength of the yarn.

Bath concentrations within the range of 10 to 30% of sodium sulphate and for sodium hydroxide within the range of 5% to the point where the amine is salted out were found to be effective for producing important improvements in the interfacial process of spinning. Thus, these improvements were specific to hot spinning baths containing sodium sulphate and sodium hydroxide, and were effected when the temperature of the spinning bath was maintained within the range of 40 to 100° C. and appeared to be optimum within the range of 75 to 90° C. Filaments spun by using these modified spinning baths in this temperature range showed none of the tendency inherent in the filament spun by the other procedures to adhere to each other when wound up on the spinning bobbin. Hence, the washing procedures previously described could in large part be dispensed with, particularly those involving the volatile solvents such as methyl alcohol, ethyl alcohol and acetone. Not only did the filaments not adhere to each other externally but the internal surfaces of the hollow spun tubes, when collapsed, did not adhere together, thus giving the filaments greater absorption capacity, a more resilient feel and handle, and improved ease of processing in the usual subsequent textile operations. These collapsed tube filaments could be made in a wide range of width to thickness ratios, i. e., from 10 to 1 up to 100 to 1 and even greater, depending in part on the concentration and composition of the solution spun, the composition and concentration of the spinning bath, the size of the spinneret orifice and the rate of yarn withdrawal from the spinning bath, among others.

*Example XI*

Employing the equipment of Example V, a spinning bath was used having a weight composition of 6% hexamethylenediamine, 4% of 3,3'-iminobispropylamine and 30% sodium sulphate with the remainder water. In this bath was extruded a spinning solution having a weight composition of 10% adipyl chloride in chlorobenzene through a 60-hole tantalum spinneret with 0.003 inch orifices wherein the jet velocity was 43 yards per minute. The bath velocity in the cocurrent tube was maintained at 54 yards per minute while withdrawing the yarn at 75 yards per minute. The yarn was wet stretched 1.24 times and wound up on a bobbin at 93 yards pre minute. Throughout the spin, the bath temperature was maintained at 75 to 85° C. whereas the spinning solution was maintained at approximately room temperature. The yield, based on adipyl chloride, was 75% over a 4-hour period of operation. The yarn as wound up on the bobbin, even without the use of a wash at this point, did not adhere to the yarn package. It could be unwound when dry with 60 filaments in the yarn bundle as separate entities.

*Example XII*

The filaments were again produced as described in Example V except that the yarns were found up on a bobbin without washing the yarn after it had left the spinning bath. When the yarn cake was doffed, it was found that the yarn could not be unwound from the bobbin either while wet or dry. The yarns had adhered to each other so completely that the yarn bundle could not be lifted from the surface of the cake. In other instances where starting ends could be lifted from the surface of the cake, the yarn could not be unwound because a plurality of filaments kept breaking out of the yarn bundle, very shortly causing the whole yarn bundle to break down. This difficulty was overcome by proceeding as described in Example V where the yarn was washed as it was wound up. It was usually preferred to unwind this washed cake while it was still wet with the washing fluid and pass it through a drying chimney. The filaments produced in this way had a substantially coalesced or unitary ribbon-like structure.

In the matter of yields, it has been found that higher yields are obtained when using smaller spinneret orifices and that higher yields were also given by increasing the stretch ratio between the spinneret and the first roll. Toward this end the use of 3-mil orifices and even 1-mil orifices was found to markedly improve the yields in the process of interfacially spinning yarns. Consequently, when using all the refinements described, it was possible to approach a yield of nearly 100% based on the acid chloride ingredient.

It was found possible to improve the strength of interfacially spun yarns by employing suitable yarn aftertreatments, i. e., treatments which are applied to the yarn after it has been produced by the interfacial process, such treatments either being applied to the still wet yarn in the course of the forwarding or windup steps or to the yarn either on or off the package after it has been doffed from the windup. One such treatment involved the use of calcium thiocyanate in an approximately 55% solution applied to the yarn on the roll used to withdraw it from the spinning bath. Such treatments produced a 5- to 10-fold increase in the wet strength of the as-spun yarn.

*Example XIII*

A yarn was produced as described in Example XI except that the spinning solution was 10% sebacyl chloride in chlorobenzene and the spinning bath comprised 10% hexamethylenediamine and 30% sodium sulphate in water. The yarn thus produced was boiled in water to remove the chlorobenzene solvent and then placed in ethanol overnight. The next morning the yarn was removed from the ethanol, washed in cold water and then immersed in an approximately 55% aqueous solution of calcium thiocyanate at 140° C. for 15 seconds. Following a 1-minute water wash at room temperature, the yarn was drawn while wet to 4 times its length at room temperature to produce a bright strong yarn. When the yarn was not washed after the treatment with thiocyanate solution, it could be drawn to 6 times its length or more, although the strength and appearance of the final yarn were not much different in either case.

A similar effect was also obtained in these yarns by treating with an approximately 50% aqueous solution of lithium iodide. Thus, it appeared that a treatment with an appropriate hydrotropic salt solution rendered the originally as-spun rather crystalline yarn amorphous, in which condition it was more amenable to the usual drawing techniques. After drawing, the yarn was again crystalline, but of course much more highly oriented.

Some improvement could also be obtained by using calcium thiocyanate in dilute solutions, i. e., 5% in alcohol as a deswelling agent for the freshly spun yarn. Such a treatment resulted in a further increase in the yarn tenacity.

Another aftertreatment, which has successfully raised the tenacities of interfacially spun yarns, consisted of a further polymerization in the solid state to increase the molecular weight of the synthetic polymeric chains in the yarn structure. Generally speaking, the treatment involved the vacuum treatment of a yarn at an elevated temperature which was at least 10 to 20° C. below the melting point of the yarn. A suitable pressure for such treatment was found to be in the order of 2 mm. mercury absolute, although higher or lower pressures were operable. This method was primarily adapted to the treating of yarns on yarn packages, rather than yarns on the run, since times of some magnitude (above the order of a few seconds) were usually required. Following this re-polymerization treatment, the yarns were usually drawn at elevated temperatures in the range of 120 to 185° C. from 1½ to 4 times in length, depending upon the characteristics of the particular yarn in hand. The result was a yarn of markedly improved strength being of the order of 5 to 10 times stronger than the yarns not so treated.

Since many different embodiments of the invention may be made without departing from the spirit and scope thereof, it is to be understood that the invention is not limited by the specific illustrations except to the extent defined in the following claims.

What is claimed is:

1. A condensation polymer filament having the structure of a collapsed tube the walls of which are less than twenty hundred-thousandths of an inch thick.

2. A condensation polymer filament having the structure of a collapsed tube, the walls of which are coalesced on their inner surface, resulting in a ribbon-like structure one to forty hundred-thousandths of an inch thick.

3. The structure of claim 2 characterized by a cross section which has a length to width ratio of at least 10:1.

4. The structure of claim 2 wherein the said tubing in its uncollapsed condition has a diameter between about 0.0005 and 0.020 inch.

5. A condensation polymer filament characterized by having a tube-like structure wherein the tube is collapsed to give an elongated cross-section having a minimum width of up to forty hundred-thousandths of an inch and a length of at least ten times as great.

6. The structure of claim 1 wherein the polymer is substantially unoriented.

7. The structure of claim 1 wherein the polymer is highly crystalline and oriented along the fiber axis.

8. The structure of claim 2 wherein the polymer is a polyamide.

9. The structure of claim 8 wherein the polyamide is a polyhexamethylene adipamide.

10. The structure of claim 8 wherein the polyamide is a polyhexamethylene sebacamide.

11. A condensation polymer filament having a hollow core along its longitudinal axis wherein the wall of the said filament is less than about twenty hundred-thousandths of an inch thick.

References Cited in the file of this patent

UNITED STATES PATENTS

| | | |
|---|---|---|
| 1,464,048 | Rousset | Aug. 7, 1923 |
| 2,002,153 | Mendel | May 21, 1935 |
| 2,274,255 | Pierce | Feb. 24, 1942 |
| 2,354,435 | Stedman | July 25, 1944 |
| 2,476,293 | Hall et al. | July 19, 1949 |